United States Patent [19]

Nusser

[11] 4,178,942
[45] Dec. 18, 1979

[54] APPARATUS FOR AGRICULTURAL MACHINES

[76] Inventor: Josef Nusser, D-7963 Eichstegen, Fed. Rep. of Germany

[21] Appl. No.: 884,646

[22] Filed: Mar. 8, 1978

[51] Int. Cl.² .............................................. A01F 7/06
[52] U.S. Cl. .................................. 130/23; 130/27 T; 130/30 H
[58] Field of Search ................ 130/23, 27 R, 27 T, 130/30 H; 56/14.6; 209/289, 290, 291

[56] References Cited

U.S. PATENT DOCUMENTS

| 457,538 | 8/1891 | Moulton | 130/30 H |
|---|---|---|---|
| 961,775 | 6/1910 | Herr | 130/23 |
| 1,257,058 | 2/1918 | Williams | 130/30 H |
| 1,386,298 | 8/1921 | Winslow | 209/291 |
| 1,951,070 | 3/1934 | Stein | 130/27 T |
| 2,543,537 | 2/1951 | Smith | 130/30 H |
| 3,756,406 | 9/1973 | Khan | 209/291 |
| 3,776,242 | 12/1973 | Khan | 130/27 T |
| 3,927,678 | 12/1975 | Rowland-Hill | 130/27 T |

Primary Examiner—Jay N. Eskovitz
Attorney, Agent, or Firm—Dressler, Goldsmith, Clement, Gordon & Shore, Ltd.

[57] ABSTRACT

An apparatus is provided for receiving, separating, distributing, and conveying mixture of materials, such as a mixture of grain, straw and chaff, in a manner that separates small particles of one kind, such as grain, from the rest of the mixture. Inner and outer co-axially aligned cylinders are mounted about a central longitudinally extending drive shaft. The inner cylinder has a generally solid wall and the outer cylinder is foraminous with a plurality of spiral guides mounted on its interior and exterior surfaces. A plurality of discs are mounted at spaced intervals along the shaft within the inner cylinder with the plane of each disc oriented at a non-right angle with respect to the axis of the shaft. A ring is mounted on the periphery of each disc and is adapted for rotation relative thereto. Tines project at circumferentially spaced locations from each ring through elongated apertures in the inner cylinder into the annular space defined between the exterior of the inner cylinder and the interior of the outer cylinder. The drive shaft may be rotated by a suitable drive means and the inner and outer cylinders may also be rotated in the same or opposite directions by the same or different drive means. In operation, the material, such as a mixture of grain, straw and chaff, is fed into the annular space between the inner and outer cylinders and conveyed axially therealong between the two cylinders where it is agitated by the projecting tines whereby the grain particles fall through the holes in the foraminous outer cylinder and whereby the chaff and straw are retained within the outer cylinder until they are discharged from the cylinder at the end opposite the feed end. The grain particles passing through the foraminous cylinder are collected in a suitable collecting trough which is spaced from, and partially or completely encloses, the outer cylinder.

27 Claims, 11 Drawing Figures

APPARATUS FOR AGRICULTURAL MACHINES

BACKGROUND OF THE INVENTION

The invention relates to an apparatus for agricultural machines, and particularly to machines used for the distribution, separation and conveying of the material delivered from a threshing means of a harvester-thresher.

With harvester-threshers or similar harvesting machines it is necessary to separate the yielded mixture of grain, (e.g., corn), straw and chaff. To meet these requirements vibrating systems are known which are divided into a plurality of vibrating elements and which are provided with a screening surface. These have the disadvantage that the vibrating movements caused by a crank drive produce strong forces or loads and produce stresses in the vibrators and the drive members. In addition this design requires a good deal of space and a corresponding expensive construction owing to the size of the machine. Further, a complete separation of the grain from the mixture never could be accomplished completely.

SUMMARY OF THE INVENTION

The present invention addresses the problem of distribution of the threshed material in a small space and on separation and conveyance of it as it originates from the threshing means.

According to the present invention this problem is solved by providing rotating cylinders aligned in a material conveying direction and which are arranged coaxially about a central shaft. An outer cylinder is provided with a screening surface and an inner cylinder is provided with apertures from which tines protrude and extend into the area between the cylinders. The tines are fastened to a ring by holders and the ring is mounted on a disc for rotation relative thereto. The disc is fastened on an angle with respect to the rotating central shaft for forming a distribution group. One or several distribution groups may be thus mounted on the shaft.

For further simplification of the apparatus, the invention moreover provides that the outer cylinder is fixedly mounted to the machine frame or grain collector and is locked against rotation relative thereto.

The separation of the grain, straw and chaff mixture is accomplished according to another embodiment of the invention in that the outer cylinder can be of multi-wall design and having a screening surface.

A dependable conveying of the material to be conveyed is assured according to the invention in that the cylinders are provided with spirally shaped conveying rods.

A secure distribution of the material to be conveyed and a quiet, vibration-free operation of the apparatus is accomplished according to the invention in that the discs are fastened to the shaft in a staggered array by the same twist angle in relation to each other and in that the twist angle from one disc to the next one is a function of the number of discs on the shaft.

An optimal adjustment to differential operating tasks and consistence of the material being harvested is accomplished according to the invention in that the cylinders can be propelled in the same, or in opposite, direction of rotation.

Advantageously the adjustment for difficult operating conditions, (for example, high quantities of throughputs, or moist, conglomerated material) is accomplished according to still another improvement of the invention in that the central shaft can be propelled with the discs in the same, or in the opposite direction of rotation as the rings.

The capability for changing the space between the cylinders along their length is offered according to the present invention in that the cylinders are each designed completely or partly as a frustum.

Quiet and dependable operation of each distribution group (comprising the disc, ring and tines) is accomplished according to another improvement of the invention in that the openings (for the tines) associated with each distribution group and the openings of the several adjacent distribution groups are arranged and staggered by the same angle of twist, which twist angle is a function of the number of distribution groups.

A particularly effective drive and guidance of the tines and rings is accomplished according to the invention in that the openings are designed as guiding slots and are provided with sliding surfaces with which the tines or their holding means are engaged.

According to the invention, to protect, to as great an extent as possible, the points of contact of the tines or their holding means with the sliding surfaces of the guiding slots against wear, the points of contact of the tines or their holding means with the sliding surfaces of the passage openings are designed as sliding surfaces.

The driving of the rings and tines is accomplished according to another improvement of the invention in that the rings can be provided with bevel gears in engagement with a bevel gear fastened to a hollow shaft around the central shaft, and in that the central shaft is positioned concentrically within the hollow shaft and both shafts can be propelled in the same or in opposite directions of rotation.

A uniform circular operation is accomplished according to another aspect of the invention in that the contacting sliding surfaces are so shaped and arranged with respect to the number of revolutions, the direction of rotation, the angle of inclination and the dimension of the rings, the cylinders and the discs that a uniform circular operation of the rings will result.

The apparatus of the present invention can also be used with material to be unloaded from a harvesting truck. The material must be torn away from the staple, delivered, and then be distributed and conveyed in uniform quantities rearward, or to the side, into a blower or similar conveying system. This problem is solved according to the present invention in that a portion of the outer cylinder can be cut away to yield a circular or semi-cylindrical section of the required opening shape and size.

In order to correspondingly provide proper conveyance, separation and distribution of the material according to the requirements, the ends of the tines in the apparatus of the present invention can be angled towards the conveying direction of the material.

Rapid conveying of the material is accomplished according to the invention in that one or both cylinders may also be equipped with conveying rods of a prong-like design.

Trouble-free transfer of the material from the threshing means to the area between the outer and inner cylinder is best effected if the threshing drum is longitudinally aligned with the threshing means. Of course, the threshing drum also may be arranged with its axis parallel to them.

Different harvesting conditions require that the distance between the threshing drum and the threshing basket be variable. For that purpose, in accordance with the invention the threshing drum and the threshing basket may be designed as frustums and/or may be displaceable axially relative to each other.

Numerous other advantages and features of the present invention will become readily apparent from the following detailed description of the invention and embodiments thereof, from the claims and from the accompanying drawings.

BRIEF DESCRIPTION OF THE DRAWINGS

In the accompanying drawings forming part of the specification, and in which like numerals are employed to designate like parts throughout the same.

DESCRIPTION OF THE PREFERRED EMBODIMENTS

Figure 1:
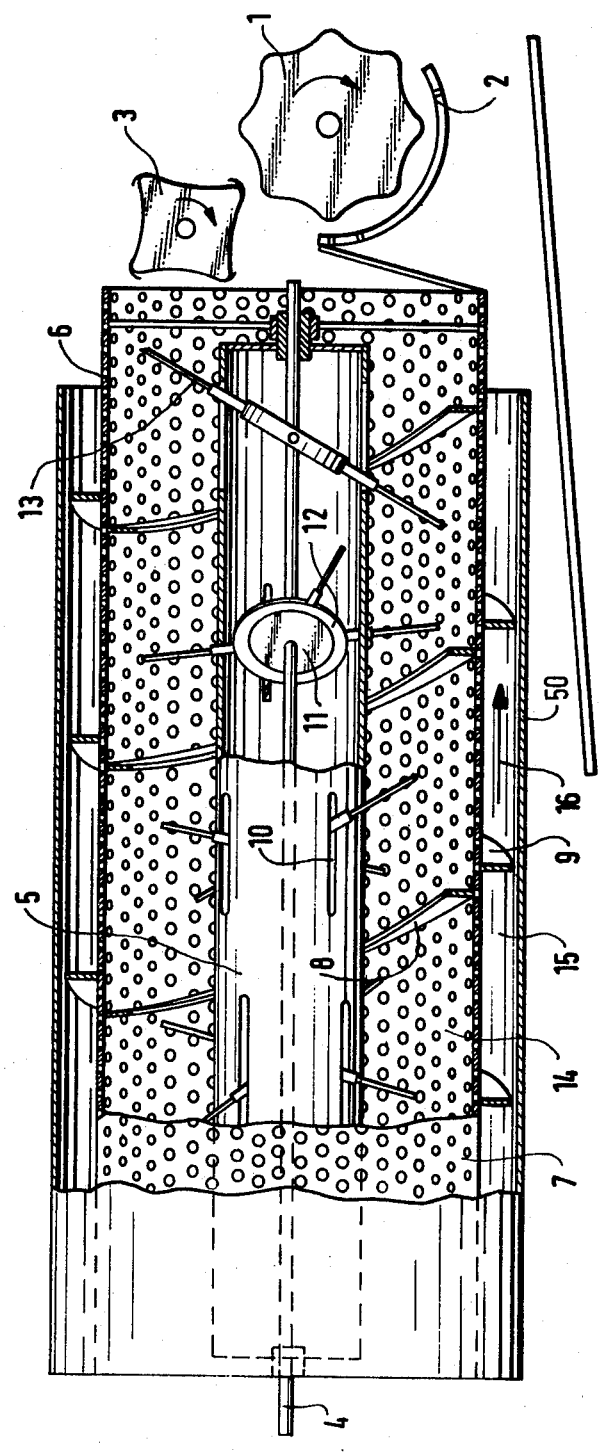
FIG. 1 is a simplified, schematic representation of a side view of a first embodiment of the apparatus of the present invention with portions cut away to better show interior parts.

A first embodiment of the apparatus of the present invention is represented schematically in FIG. 1 and is arranged in the downstream conveying direction of the material delivered from a threshing drum 1, a threshing basket 2, and a straw guiding drum 3 supported in the machine frame or collector 50 (supports not illustrated).

The central shaft 4 is positioned in the machine frame and surrounded by rotatable inner and outer cylinders 5 and 6, respectively. The cylinders 5 and 6 could be of a multiple wall design and cylinders 5 and 6 may be designed with screening surfaces for separating the corn-chaff mixture. The cylinder 6 can be mounted to the machine frame for being releasably locked against rotation relative thereto. Preferably, cylinder 6 has the screen surface 7 and is provided with internally and externally mounted spiral-shaped conveying rods 8 and 9, respectively. The conveying rods 8 may also be mounted on the exterior of cylinder 5, which cylinder 5 defines passage openings 10 therein. Appropriately, the conveying rods or guides 8 and 9 can have, in the area of the conveying length, a variable pitch.

Several discs 11 are mounted on the central shaft 4 at a non-right angle with respect to the shaft axis. Rings 12 are provided on the circumference of each disc 11 and are mounted for rotation relative thereto. Outwardly projecting tines 13 are removably fastened by holding means to the discs 11. The tines 13 protrude through the apertures or openings 10 in the cylinder 5 and into the volume or space 14 between the cylinders 5 and 6. It can be seen that rotation of the rings 12 will produce an oscillatory movement superimposed upon the rotary movement.

To achieve a uniform operation and to prevent any imbalance, each disc 11 is oriented along the shaft relative to the subsequent one by the same angle of twist. The twist angle is preferably 360° divided by the number of discs 11 on the shaft 4.

The manner of operation is as follows: First, the material obtained from the threshing means, the previously described elements 1, 2, and 3, is received in the area between the cylinders 5 and 6. The tines 13 catch the material and assure uniform distribution and loosening up of the material. By coaction with the conveying rods 8 and 9, the material is simultaneously conveyed rearwardly. Under this operation the smaller particles (e.g., grain particles) pass through the screening surface 7 of the outer cylinder 6 and into area 15. A cylindrical collector 50 may be provided to receive the particles and permit them to be conveyed back by the conveying rods 9 in the direction of the arrow 16. At the same time the straw and chaff moves further back in the cylinder 6 and leaves the apparatus at the far end opposite the threshing means.

The use of multiple wall cylinders with a foraminous outer cylinder allows for separation of the corn and chaff mixture, particularly when an air current is introduced between the cylinder walls for pneumatic separation.

Another advantage of the invention resides in the fact that, in place of the oscillatory vibrating surfaces of prior art mechanisms (which for reasons of durability can be vibrated at only a limited number of rpm), only rotating components are used and this permits operation at a higher rpm. Thus, the loads upon the components are reduced and the operating effectiveness is increased substantially. Moreover, the circular design of the foraminous separation surface allows for great space savings. Further, the efficiency of the apparatus is not adversely affected in, for example, an inclined position.

The present invention can be applied advantageously in other appliances, in fact wherever it is desired to break up, distribute, convey, separate and meter material with simple means.

The apparatus of the present invention is particularly appropriate for receiving the material unloaded from a harvesting truck, to distribute it, and to convey it in metered amounts rearwardly or to the side. For this, the apparatus must be mounted transversely to the vehicle and the outer cylinder 6 must be provided with a cutout which is large enough to allow the material to be conveyed to enter the apparatus. In such a case, where the apparatus is to function only as a conveyor, the outer cylinder 6 is preferably not foraminous.

Figure 2:
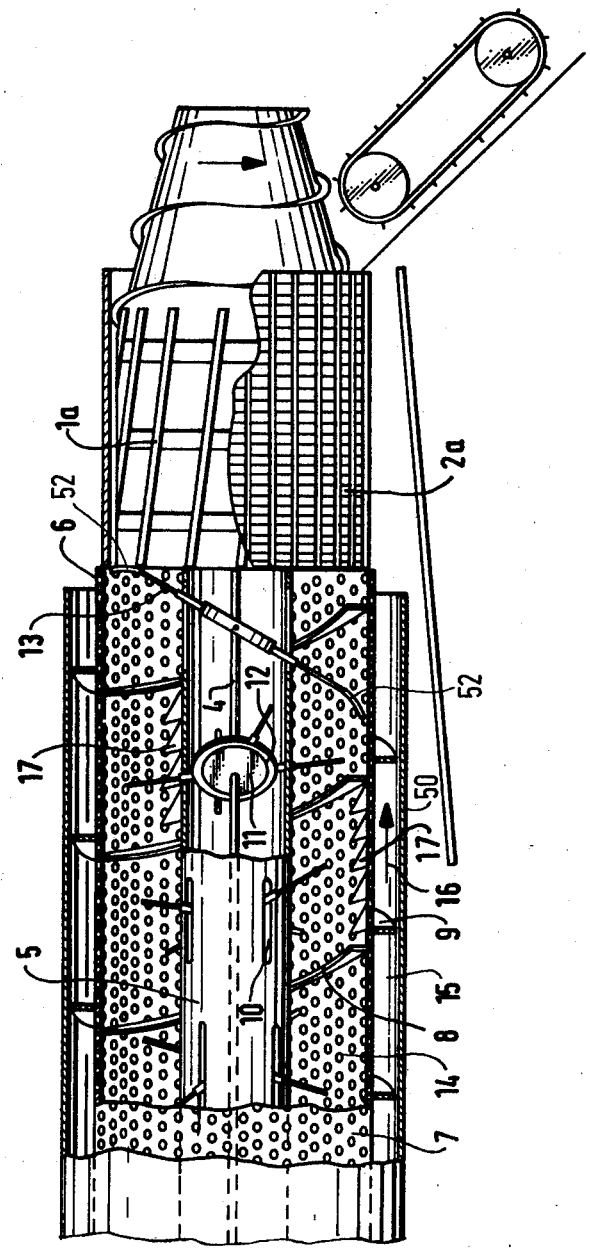
FIG. 2 is a view similar to FIG. 1, but showing a second embodiment of the apparatus of the present invention.

In the second embodiment of the present invention, as illustrated in FIG. 2, a threshing drum 1a and a threshing basket 2a are arranged in coaxial, longitudinal alignment with the cylinders 5 and 6 whereas, in the first embodiment illustrated in FIG. 1, the axes of the drum 1 and basket 2 are perpendicular to the common axis of the cylinders 5 and 6. To accomplish a rapid conveying of the material, rearwardly projecting prong-like rods or members 17 are mounted in cylinder 6 and the ends 52 of some or all of the tines 13 are angled rearwardly in the direction of the conveying of the material. Alternatively, the members 17 may also be mounted to the exterior of the inner cylinder 5.

Figure 3:
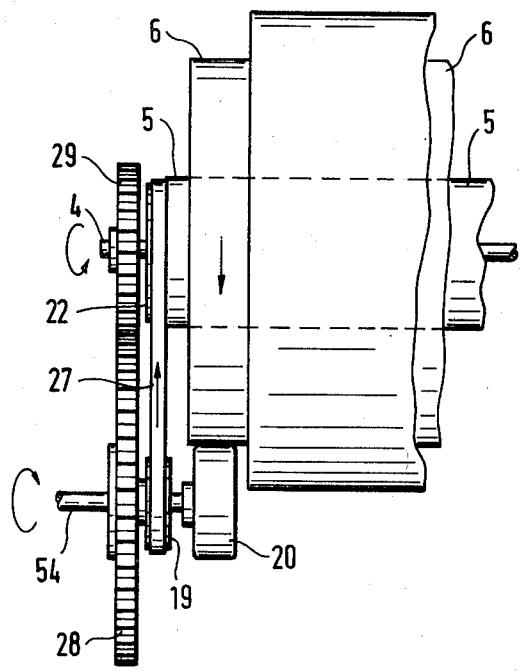
FIGS. 3 and 4 are separate modifications of the left end of the apparatus of the present invention illustrated in FIG. 1 and constituting, respectively, a third and fourth embodiment of the invention.

FIG. 3 illustrates a third embodiment of the present invention wherein the shaft 4 to which the discs 11 are secured may be rotated in a direction opposite to that of the inner and outer cylinders 5 and 6, respectively. Specifically, a separate drive shaft 54 is provided for being driven by a suitable drive means, (such as a motor, not illustrated). A gear 28 is secured to the shaft 54 and a gear 29 is mounted to the shaft 4 and in engagement with gear 28. Rotation of shaft 54 in one direction therefore causes rotation of shaft 4, through the gears 28 and 29, in the opposite direction.

A drive wheel 19 may be provided on shaft 54 adjacent gear 28 and a driven wheel 22 may be provided on the end of cylinder 5. The driven wheel 22 may be drivingly connected with drive wheel 19 by means of a suitable chain or belt 27. Thus, rotation of shaft 54 causes rotation of the cylinder 5 in the same direction as the shaft 54.

Additionally, a drive wheel 20 may be provided on shaft 54 and in contact with the exterior surface of cylinder 6. Rotation of shaft 54 in one direction therefore causes rotation of cylinder 6 in the opposite direction.

Figure 4:
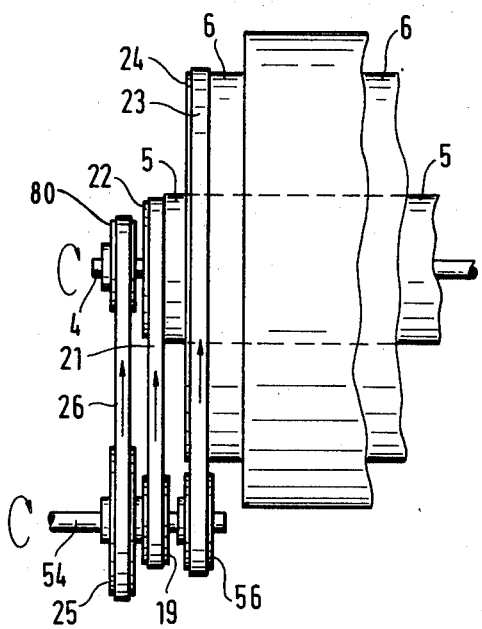

If it is desired to rotate the inner cylinder 5 and the outer cylinder 6 in the same direction, a fourth embodiment of the present invention can be used as illustrated in FIG. 4. The drive wheel 20 illustrated in FIG. 3 is replaced with a drive wheel 56 in FIG. 4, which wheel 56 is adapted to engage a drive belt 23. A driven wheel 24 is secured to the end of the outer cylinder 6 and is adapted to also receive the drive belt 23. Thus, rotation of the shaft 54 in one direction causes rotation of the cylinder 6 in the same direction.

Further, if it is desired to rotate the shaft 4 in the same direction as the inner and outer cylinders 5 and 6, the gear drive (gears 28 and 29 illustrated in FIG. 3) can be replaced, as illustrated in FIG. 4, by 1) a drive wheel 25 on shaft 54, 2) a driven wheel 80 on shaft 4, and 3) by a belt 26 interconnecting the drive wheel 25 and the driven wheel 27. Thus, rotation of the shaft 54 in one direction will cause rotation of the shaft 4 in that same direction.

Figure 5:
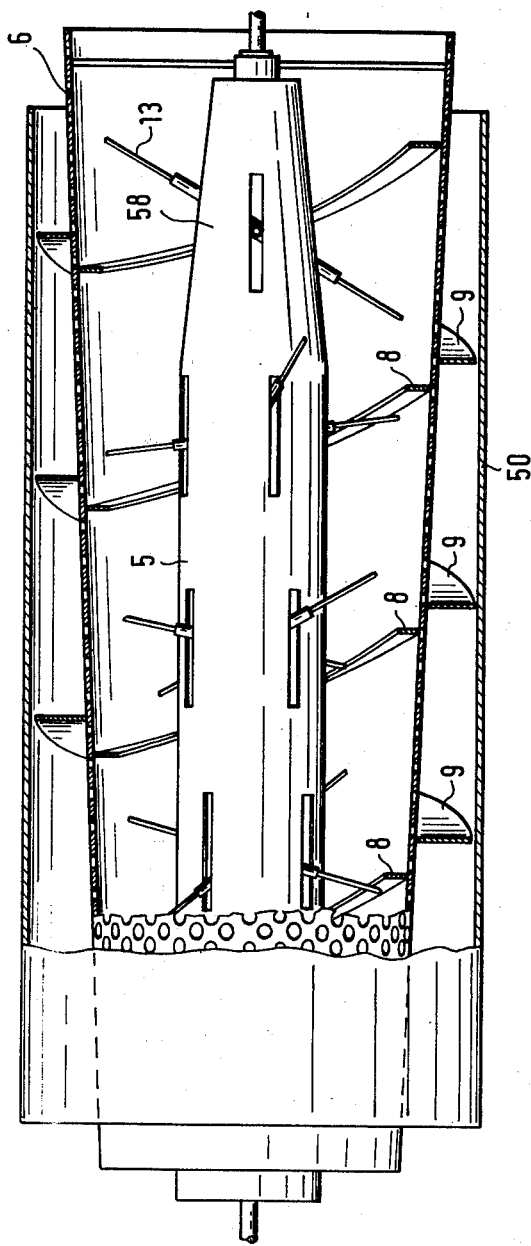
FIG. 5 is a view similar to FIG. 1, but showing a fifth embodiment of the present invention.

FIG. 5 illustrates a fifth embodiment of the present invention. In this embodiment, the outer cylinder 6 is substantially frustum-shaped and a portion 58 of the inner cylinder 5 is also substantially frustum-shaped. This provides a variation in volume or space between the inner cylinder 5 and the outer cylinder 6.

Figure 6:
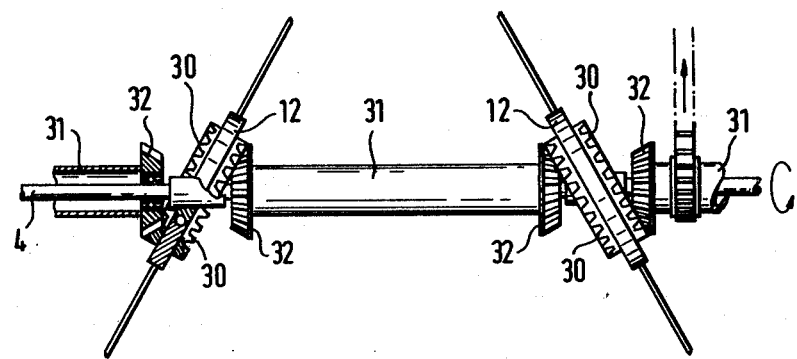
FIG. 6 is a view of a portion of the internal shaft and disc members of a sixth embodiment of the present invention.

FIG. 6 illustrates a sixth embodiment of the present invention wherein the rings 12 may be driven by a shaft. Specifically, each ring 12 has a pair of bevel gears 30 mounted to each side. An outer shaft 31 is provided concentric with and surrounding shaft 4. A pair of bevel gears 32 may be provided on shaft 31 adjacent each side of the ring 12 and in engagement with the bevel gears 32 mounted thereon. Either or both shafts 31 and 4 may be driven. If both shafts are driven, they may be driven in the same or opposite directions of rotation. If only one shaft is driven the other shaft may be held stationary.

Figure 7:
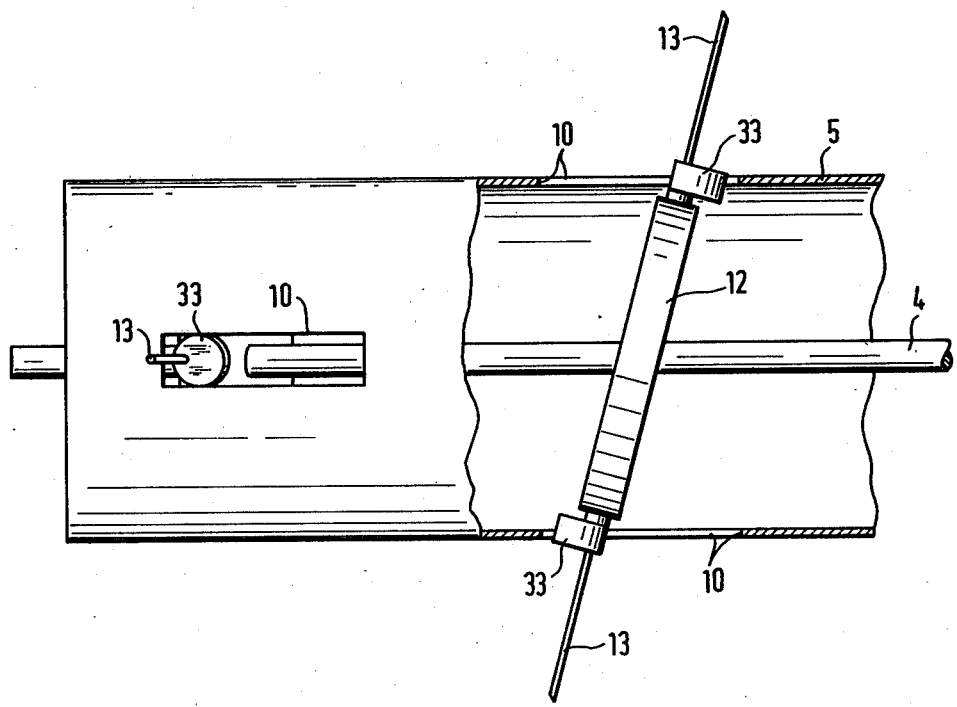
FIG. 7 is a view similar to FIG. 1, but showing a seventh embodiment of the present invention.

FIG. 7 illustrates a seventh embodiment of the present invention wherein uniform circular motion of the ring 12 may be effected. Specifically, sliding members 33 are mounted to each of the tines or to the tine holders (not illustrated) if tine holders are used. The sliding members 33 are generally circular and are mounted eccentrically on the tines 13 within the apertures or openings 10 of the inner cylinder 5. Thus, the sliding members are in continual sliding engagement with the apertures 10 and cause the rings 12 to undergo a uniform circular motion as the cylinder 5 rotates.

Figure 8:
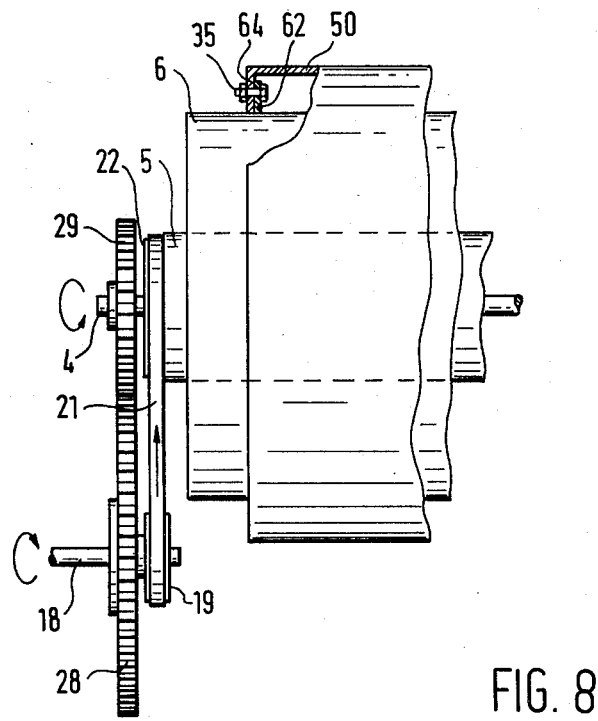
FIG. 8 is a view similar to FIGS. 3 and 4, but showing an eighth embodiment of the present invention.

An eighth embodiment of the apparatus of the present invention is illustrated in FIG. 8 wherein the outer cylinder 6 is prevented from rotating relative to the cylindrical collector 50. Specifically, the outer cylinder 6 has an outwardly projecting peripheral flange 62 and the cylindrical collector 50 has an inwardly projecting flange 64 adjacent the flange 62. A bolt 35 is provided for fastening the flanges together and preventing rotation of the outer cylinder 6 with respect to the stationary collector 50.

Figure 9:
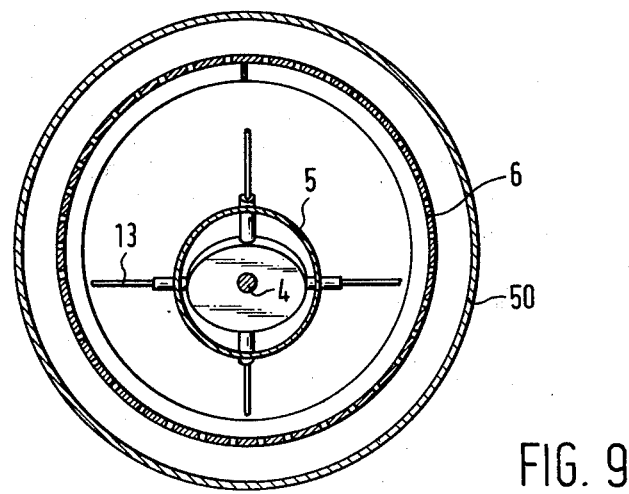
FIG. 9 is an axial cross-sectional view of a ninth embodiment of the present invention.

FIG. 9 illustrates a ninth embodiment of the present invention wherein the longitudinal axis of the outer cylinder 6 is not concentric with the shaft 4. Specifically, the axis of the outer cylinder 6 is parallel to, but upwardly displaced from, the shaft 4 whereby the rotation of the cylinder 6 is eccentric with respect to the shaft 4.

Figure 10:
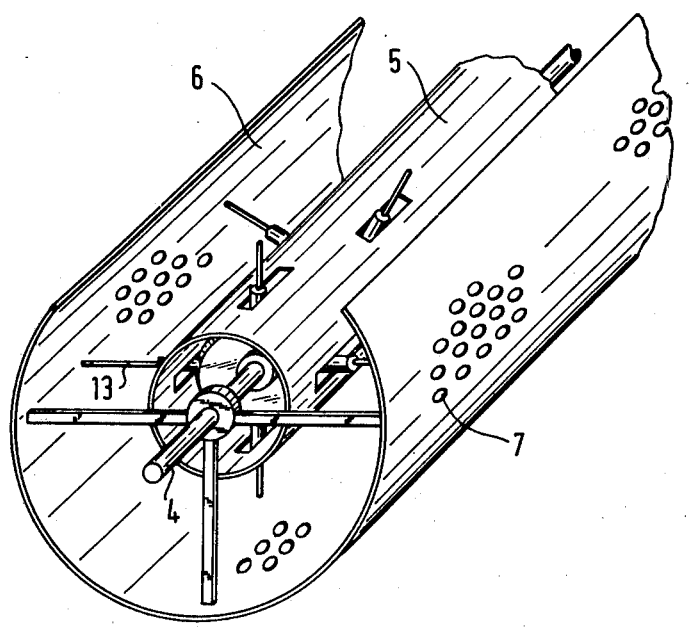
FIG. 10 is a partially cut away, perspective view of a tenth embodiment of the present invention.

The tenth embodiment is illustrated in FIG. 10 and shows the apparatus adapted to receive material dumped in from above, as from a truck, instead of conveyed into the end as in the embodiments illustrated in FIGS. 1 through 9. Specifically, the outer cylinder 6 may be semi-cylindrical to provide an opening to allow the passage of material therethrough into the space around the inner cylinder 5. Alternatively, the outer cylinder 6 could merely have a cutout or large aperture in a portion of a wall and the rest of the wall could be a true cylinder. Of course, in the embodiment illustrated in FIG. 10, the outer member 6 does not rotate and would remain stationary with the opening at the top of the apparatus.

From the foregoing, it will be observed that numerous variations and modifications may be effected without departing from the true spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

Figure 11:
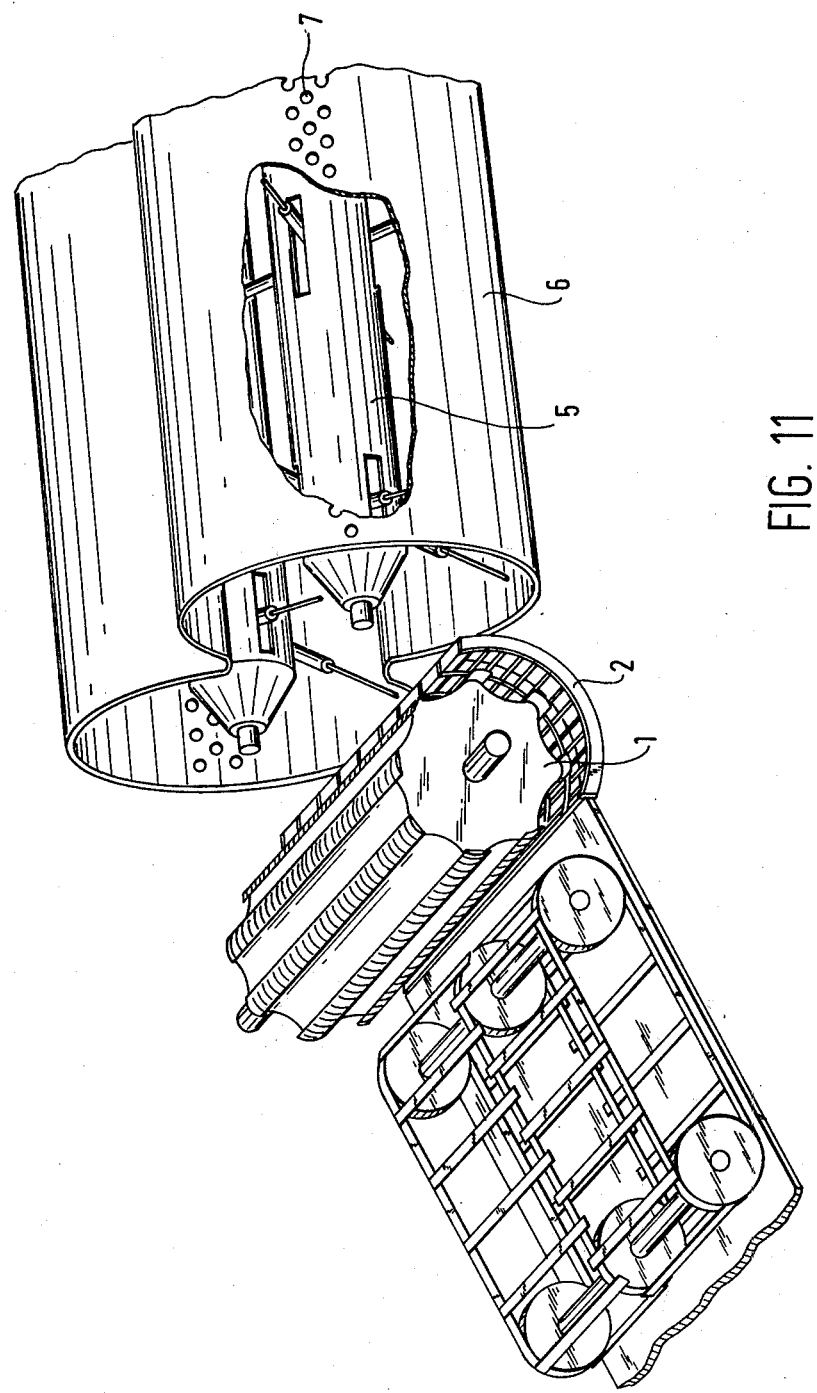
FIG. 11 is a partially cut-away, fragmentary perspective view of an eleventh embodiment of the present invention.

FIG. 11 illustrates another embodiment wherein two distribution groups, which are disposed side by side, are mounted behind the conveyor followed by the threshing drum-threshing basket unit. Their axes have a distance from each other which is smaller than the diameter of their cylinders. In this manner cylinders are obtained which are connected along two generating lines these cylinders have in common.

Other than the preceding embodiments said two distribution groups have no rotary cylinders. The machine has a particularly compact construction and a low overall height. Another embodiment conceivable has three distribution groups disposed side by side.

What is claimed is:

1. An apparatus for distributing, separating and conveying a mixture of material discharged from the threshing means of a harvester/thresher comprising:
 a frame;
 a central shaft mounted on said frame;

a foraminous first wall means defining an outer hollow enclosure mounted on said shaft with its longitudinal axis in a substantially non-vertical position;

a second wall means defining an inner hollow enclosure disposed within said outer enclosure and mounted on said central shaft with its longitudinal axis in a substantially non-vertical position, said second wall means of said inner enclosure having apertures therein;

a plurality of mixture distribution groups provided along said central shaft, each said mixture distribution group comprising a disc secured to said shaft with the plane of the disc at a non-right angle relative to said central shaft, a ring mounted around the periphery of said disc in the plane of the disc and adapted to rotate relative to said disc, and tines secured to said ring in the plane of the ring and projecting outwardly through said apertures of said inner enclosure and into the space between said inner and outer enclosures whereby relative rotation of said shaft and said enclosures rotates said tines for agitating said mixture thus causing smaller particles in said mixture to pass through said foraminous first wall means of said outer enclosure and be thus separated from larger particles in said mixture.

2. The apparatus in accordance with claim 1 in which a portion of at least one of said inner and outer enclosures is at least partially frustoconically shaped.

3. The apparatus in accordance with claim 1 in which said inner enclosure is a hollow cylinder and in which said outer enclosure is a hollow cylinder having at least one substantially open end adapted to pass said mixture of material.

4. The apparatus in accordance with claim 3 in which said outer cylinder is releasably secured to said frame against rotation relative thereto.

5. The apparatus in accordance with claim 3 in which said first wall means includes multiple walls and includes a screening surface.

6. The apparatus in accordance with claim 3 in which said second wall means includes multiple walls and includes a screening surface.

7. The apparatus in accordance with claim 3 in which at least one of said inner and outer cylinders further includes spirally shaped conveying guide rods along its respective wall means.

8. The apparatus in accordance with claim 3 in which said outer cylinder and said inner cylinder are coaxial and in which at least one of said cylinders is adapted to rotate in at least one of two directions of rotation.

9. The apparatus in accordance with claim 3 in which said shaft is adapted to rotate about its axis in at least one of two directions of rotation.

10. The apparatus in accordance with claim 9 in which said rings are rotatable in at least one of two directions of rotation.

11. The apparatus in accordance with claim 3 in which each said said disc is oriented along the shaft relative to an adjacent disc by an equal twist angle, said twist angle being a function of the number of discs along the shaft.

12. The apparatus in accordance with claim 11 in which said twist angle is preferably the quotient of 360° divided by the number of discs along said central shaft.

13. The apparatus in accordance with claim 11 in which said apertures in said second wall means of said inner cylinder associated with each of said mixture distribution groups are oriented in said second wall means by the same angle of twist as said discs.

14. The apparatus in accordance with claim 3 in which the longitudinal axis of said inner cylinder is coaxial with said central shaft and in which the longitudinal axis of said outer cylinder is parallel to, but displaced from, said central shaft.

15. The apparatus in accordance with claim 3 in which said apertures in said second wall means comprise guide slots having sliding surfaces adapted to engage said tines.

16. The apparatus in accordance with claim 15 further including circular sliding members eccentrically mounted to said tines and engaged with said sliding surfaces in said openings whereby a uniform circular motion of said rings is produced upon relative rotation of said shaft and said inner cylinder.

17. The apparatus in accordance with claim 3 further including a second hollow shaft mounted around, and coaxial with, said central shaft, at least one of said central shaft and said hollow shaft adapted to rotate about its longitudinal axis, said hollow shaft having at least one bevel gear mounted thereon and said apparatus further including a gear crown on at least one of said rings engaged with one of said bevel gears whereby said ring can be rotated by the relative rotation between said central shaft and said second hollow shaft.

18. The apparatus in accordance with claim 3 in which said first wall means defining said outer cylinder further defines a cut out opening for receiving said mixture of material.

19. The apparatus in accordance with claim 3 in which an end portion of at least one of said tines is angled outwardly and downstream in the conveying direction.

20. The apparatus in accordance with claim 3 in which at least one of said inner and outer cylinders includes prongs projecting towards the downstream conveying direction.

21. The apparatus in accordance with claim 3 in which said frame includes a generally cylindrical collector disposed around, spaced from, and generally coaxial with said outer cylinder.

22. An apparatus for distributing, separating, and conveying a mixture of material comprising:
a frame;
a central shaft mounted on said frame;
a foraminous first wall means defining an outer cylinder mounted on said shaft with its longitudinal axis in a substantially non-vertical position;
a second wall means defining an inner cylinder disposed within said outer cylinder and mounted on said central shaft with its longitudinal axis in a substantially non-vertical position, said second wall means of said inner cylinder having apertures therein;
threshing means for threshing said material and discharging the threshed material into the cylinder defined by said second wall means;
a plurality of mixture distribution groups provided along said central shaft, each said mixture distribution group comprising a disc secured to said shaft with the plane of the disc at a non-right angle relative to said central shaft, a ring mounted around the periphery of said disc in the plane of the disc and adapted to rotate relative to said disc, and tines secured to said ring in the plane of the ring and projecting outwardly therefrom through said apertures on said inner cylinder and into the space between said inner and outer cylinders whereby relative rotation of said shft and said cylinders rotates said tines for agitating said mixture thus causing smaller particles in said mixture to pass through said foraminous first wall means of said outer cylinder and be thus separated from larger prticles in said mixture.

23. The apparatus in accordance with claim 22 in which said threshing means includes a threshing drum and threshing basket oriented in longitudinal alignment.

24. The apparatus in accordance with claim 22 in which threshing means includes a threshing drum and threshing basket oriented with the axis of said drum parallel with the axis of said basket.

25. The apparatus in accordance with claim 22 in which said threshing means includes a threshing drum longitudinally aligned with said central shaft and in which said threshing drum has a partially frustoconical shape and in which said threshing means further includes a frustoconical shaped threshing basket disposed around said threshing drum.

26. An apparatus for conveying material comprising:
a frame;
a central shaft mounted on said frame;
a first wall means defining an outer cylinder mounted on said shaft with its longitudinal axis in a substantially non-vertical position;
a second wall means defining an inner cylinder disposed within said outer cylinder and mounted on said central shaft with its longitudinal axis in a substantially non-vertical position, said second wall means of said inner cylinder defining apertures therein;
a plurality of discs spaced along and secured to said shaft with the plane of each disc at a non-right angle relative to said central shaft;
a ring mounted around the periphery of each said disc in the plane of the disc and adapted to rotate relative to said disc; and
tines secured to said ring in the plane of the ring and projecting outwardly through said apertures on said inner cylinder and into the space between said inner and outer cylinders whereby relative rotation of said shaft and said cylinders causes said tines to rotate and to move said material along the space between said cylinders.

27. An apparatus for conveying material comprising:
a frame;
at least two parallel central shafts mounted on said frame;
a wall means for defining a partial hollow cylinder around each shaft, the perpendicular distance between the axes of said shafts being less than the diameter of each of said partial cylinders, said wall means having apertures therein;
a plurality of discs spaced along and secured to each said shaft with the plane of each disc disposed at a non-right angle relative to each said shaft;
tines secured to said discs on each said shaft and projecting outwardly into the space defined within said partial cylinders; and
at least a portion of each of said discs adapted to rotate relative to their respective shaft whereby rotation of both shafts causes said tines to rotate and to move the material along the space within partial cylinders and whereby said tines can be oscillated longitudinally along the axis of each shaft during rotation relative to each shaft.

* * * * *